(12) United States Patent
Halder et al.

(10) Patent No.: US 11,649,847 B2
(45) Date of Patent: May 16, 2023

(54) SCREW ABLE DEVICE WITH RETRACTABLE THREAD SECTIONS

(71) Applicant: Erwin Halder KG, Achstetten-Bronnen (DE)

(72) Inventors: Stefan Halder, Achstetten-Bronnen (DE); Kilian Lukas Schneck, Blaustein (DE)

(73) Assignee: Erwin Halder KG, Achstetten-Bronnen (DE)

( * ) Notice: Subject to any disclaimer, the term of this patent is extended or adjusted under 35 U.S.C. 154(b) by 218 days.

(21) Appl. No.: 17/085,766

(22) Filed: Oct. 30, 2020

(65) Prior Publication Data

US 2021/0131478 A1 May 6, 2021

(30) Foreign Application Priority Data

Oct. 30, 2019 (DE) ...................... 20 2019 106 029.8

(51) Int. Cl.
| | |
|---|---|
| *F16B 39/12* | (2006.01) |
| *F16B 39/02* | (2006.01) |
| *F16B 45/00* | (2006.01) |
| *F16B 13/08* | (2006.01) |

(52) U.S. Cl.
CPC ............ *F16B 39/023* (2013.01); *F16B 45/00* (2013.01); *F16B 13/0891* (2013.01)

(58) Field of Classification Search
CPC ...... F16B 13/10; F16B 45/00; F16B 13/0891; F16B 39/02

USPC ....... 411/218, 305, 312, 347, 355, 358, 271, 411/272, 264, 383
See application file for complete search history.

(56) References Cited

U.S. PATENT DOCUMENTS

| | | | | |
|---|---|---|---|---|
| 3,933,390 | A * | 1/1976 | Barrett | B63C 7/16 411/347 |
| 5,634,754 | A * | 6/1997 | Weddendorf | F16B 35/02 411/383 |
| 5,931,621 | A * | 8/1999 | Griffith | F16B 39/02 411/395 |

(Continued)

FOREIGN PATENT DOCUMENTS

| | | |
|---|---|---|
| EP | 0828950 A1 | 3/1998 |
| EP | 2713061 A1 | 4/2014 |

(Continued)

*Primary Examiner* — Gary W Estremsky
(74) *Attorney, Agent, or Firm* — Muncy, Geissler, Olds & Lowe, P.C.

(57) ABSTRACT

A screwable device having a retractable threaded section that has a generally tubular shaft extending along a longitudinal axis and having a front section formed with a radially outwardly open aperture and a rear section. At least one locking element comprising a threaded section and being radially displaceable in the aperture between an outer position with the threaded section projecting radially outward from the shaft and an inner position in which the threaded section is recessed within the tubular shaft. An actuating is rod coaxially slidable in the shaft between a front position and a rear position, the actuating rod having a push-button at its rod rear end, the actuating rod having a structure for engaging the locking element in at least one of its positions pressing the locking element into the outer locking position.

20 Claims, 5 Drawing Sheets (56) References Cited

U.S. PATENT DOCUMENTS

| | | | | |
|---|---|---|---|---|
| 6,076,437 | A * | 6/2000 | Saint Martin | F16B 39/30 470/9 |
| 6,908,271 | B2 * | 6/2005 | Breslin | F16B 39/023 411/57.1 |
| 7,959,607 | B2 | 6/2011 | Smit et al. | |
| 8,162,581 | B2 * | 4/2012 | Soltis | F16B 21/165 411/347 |
| 8,342,787 | B2 * | 1/2013 | Smith | F16B 35/02 411/383 |
| 8,672,886 | B2 | 3/2014 | Smit et al. | |
| 9,903,405 | B2 | 2/2018 | Fujimoto et al. | |
| 9,915,279 | B2 * | 3/2018 | DePietro | B21H 3/02 |
| 9,962,531 | B2 | 5/2018 | Johnson et al. | |
| 10,436,236 | B2 * | 10/2019 | Hodsdon | F16B 31/043 |
| 2006/0220394 | A1 * | 10/2006 | Halder | F16B 19/109 292/252 |
| 2012/0134740 | A1 * | 5/2012 | Halder | F16B 35/005 403/113 |
| 2014/0263903 | A1 * | 9/2014 | Ostrobrod | F16B 7/1409 248/222.12 |
| 2016/0285203 | A1 * | 9/2016 | Yang | H01M 10/48 |

FOREIGN PATENT DOCUMENTS

| | | |
|---|---|---|
| EP | 2892446 A1 | 7/2015 |
| EP | 3054174 A1 | 8/2016 |
| WO | WO2006130491 A2 | 12/2006 |

* cited by examiner

SCREWABLE DEVICE WITH RETRACTABLE THREAD SECTIONS

BACKGROUND OF THE INVENTION

This nonprovisional application claims priority under 35 U.S.C. § 119(a) to German Patent Application No. 10 2019 106 029.8, which was filed in Germany on Oct. 30, 2019, and which is herein incorporated by reference.

Field of the Invention

The present invention relates to a quick-release fastener. More particular this invention concerns a screwable device with retractable thread sections used to secure a workpiece to a jig, support table, or the like. More particular the device is related to a lock pin with threaded segments. The invention also relates to an eyebolt, i.e. for lifting a workpiece, as well as to a lifting eye.

Description of the Background Art

The present invention relates to a screwable device which is intended to be set in a threaded bore and to be removed out of the bore rapidly. Such a screwable device with retractable thread sections is known from U.S. Pat. No. 6,076,437. The screw comprises thread sections that are intended to take two positions: a first position wherein they project out of the periphery of the body and a second position wherein they are retracted into the thickness of the body. The screw further comprises a displacement portion intended to displace the thread segments from one position to the other.

Limitations and disadvantages of conventional and traditional approaches will become apparent to one of skill in the art through comparison of such systems with the present disclosure as set forth in the remainder of the present application with reference to the drawings.

SUMMARY OF THE INVENTION

It is therefore an object of the present invention to provide a quick-release fastener in which the lock pin comprises a generally tubular shaft extending along a longitudinal axis and having a front section formed with a radially outwardly open aperture and a rear section. A locking element comprising a threaded section is radially displaceable in the aperture between at least one outer position with the threaded section projecting radially outward from the shaft and an inner position in which the threaded section is recessed within the tubular shaft. An actuating rod is coaxially slidable in the shaft between at least one front position and at least one rear position. The actuating rod comprises a push-button at its rod rear end. A push-button is useful for actuating the rod, especially against a spring force. The actuating rod comprises a structure for engaging the locking element in at least one of its positions, i.e. in the at least one front position, pressing the locking element into or towards the outer locking position. The outer locking position may also be considered as a screwable configuration, in which the lock pin may be screwed in or out of a threaded bore. A spring is coaxially aligned with the longitudinal axis, having a first spring end abutting against the push-button of the actuating rod and having a second spring end abutting against an inner shoulder of the tubular shaft, the spring urging the actuating rod to its rear position. The push-button, e.g. its body, comprises a lengthwise oblong passage in which a bolt is positioned. The oblong passage limits a relative longitudinal movement between the bolt within the passage and the actuating rod. Therefore, the bolt within the oblong passage of the push-button is used to define and to limit the movement of the actuating rod within the tubular shaft of the locking pin.

The tubular shaft may comprise seats in which the bolt is accommodated thereby axially fixing the bolt to the tubular shaft. When the bolt is axially fixed to the tubular shaft, only the push-button and thereby the actuating rod has to be actuated for the limited relative movement of the tubular shaft and the actuating rod. The tubular shaft may alternatively comprise throughgoings in which the bolt is rotatably mounted thereby axially fixing the bolt to the tubular shaft. The seats and the throughgoings, in which the bolts are accommodated, may be in a direction perpendicular to the longitudinal axis of the tubular shaft. The bolt may comprise protrusions protruding radially outward the tubular shaft containing the throughgoings in which the bolt is mounted.

The locking element may comprise a stop protrusion, e.g. on its unthreaded side, such that the locking element is securely placed within the aperture of the tubular shaft. The stop protrusion may be an annular stop protrusion extending from the locking element. The at least one stop protrusion keeps the locking element within the tubular shaft, especially when pushed outward by the structure of the actuating rod.

The locking element may comprise a notch on its unthreaded side that is surrounded by at least one abutment surface section for engagement with the structure of the actuating rod. The structure of the actuating rod may comprise a first engagement collar for engaging a first abutment surface section of the locking element in the locking position. The structure of the actuating rod may comprise a second engagement collar for engaging a second abutment surface section of the locking element in the locking position. The second engagement collar may be axially spaced from the first engagement collar. A first groove is provided adjacent the first engagement collar and a second groove is provided adjacent the second engagement collar. Hence, a groove is provided adjacent each engagement collar. This configuration of the notch, the abutment surface and the structure of the actuating rod allows a very precise operation for displacing the at least one locking element between the outer and inner positions.

To define the positions of the at least one locking element even more precisely, the grooves of the lock pin may be formed with a radially depth, such that one of the first and second engagement collars substantially matches a radially depth of the notch within the locking element. Additionally or alternatively, the grooves may be formed with an axially length such that the one of the first and second engagement collars substantially matches an axially depth of the notch within the locking element.

The inner shoulder of the tubular shaft may be inclined towards the longitudinal axis. Through the inclined inner shoulder the spring may be kept coaxially centered to the longitudinal axis of the tubular shaft. The tubular shaft may comprises an outer annular stop shoulder that limits insertion of the lock pin into a threaded hole. The outer stop shoulder may comprise a seal for providing a tight, e.g. a fluid tight, seat of the lock pin within the threaded bore.

Another embodiment of the invention relates to an eyebolt which is used to be positioned within a threaded bore of a workpiece. The eyebolt comprises a generally tubular shaft extending along a longitudinal axis and having a front section formed with a radially outwardly open aperture and a rear section. A locking element comprises a threaded section. The locking element is radially displaceable in the aperture between at least one outer position in which the threaded section projects radially outward from the shaft and an inner position in which the threaded section is recessed within the tubular shaft. An actuating rod is coaxially slidable in the shaft between at least one front position and at least one rear position. The actuating rod comprises a push-button at its rod rear end. A push-button is useful for actuating the rod, especially against a spring force. The actuating rod comprises a structure for engaging the locking element in at least one of its positions, i.e. in the at least one front position, pressing the locking element into or towards the outer locking position. The outer locking position may also be considered as a screwable configuration, in which the eyebolt may be screwed in or out of a threaded bore. A spring is coaxially aligned with the longitudinal axis, having a first spring end abutting against the push-button of the actuating rod and having a second spring end abutting against an inner shoulder of the tubular shaft, the spring urging the actuating rod to its rear position. The push-button, e.g. its body, comprises a lengthwise oblong passage in which a bolt is positioned. The oblong passage limits a relative longitudinal movement between the bolt within the passage and the actuating rod. Therefore, the bolt within the oblong passage of the push-button is used to define and to limit the movement of the actuating rod within the tubular shaft of the eyebolt. The tubular shaft comprises throughgoings, in which the bolt is mounted. The bolt comprises protrusions protruding radially outward the tubular shaft. The eyebolt further comprises a one-sided open ring, wherein a first end of a one-sided open ring is connected to a first one of the protrusions and a second end of the one-sided open ring is connected to a second one of the protrusions.

The locking element may comprise a stop protrusion, e.g. on its unthreaded side, such that the locking element is securely placed within the aperture of the tubular shaft. The stop protrusion may be an annular stop protrusion extending from the locking element. The at least one stop protrusion keeps the locking element within the tubular shaft, especially when pushed outward by the structure of the actuating rod.

The locking element may comprise a notch on its unthreaded side that is surrounded by at least one abutment surface section for engagement with the structure of the actuating rod. The structure of the actuating rod may comprise a first engagement collar for engaging a first abutment surface section of the locking element in the locking position. The structure of the actuating rod may comprise a second engagement collar for engaging a second abutment surface section of the locking element in the locking position. The second engagement collar may be axially spaced from the first engagement collar. A first groove is provided adjacent the first engagement collar and a second groove is provided adjacent the second engagement collar. Hence, a groove is provided adjacent each engagement collar. This configuration of the notch, the abutment surface and the structure of the actuating rod allows a very precise operation for displacing the at least one locking element between the outer and inner positions.

To define the positions of the at least one locking element even more precisely, the grooves of the lock pin may be formed with a radially depth, such that one of the first and second engagement collars substantially matches a radially depth of the notch within the locking element. Additionally or alternatively, the grooves may be formed with an axially length such that the one of the first and second engagement collars substantially matches an axially depth of the notch within the locking element.

The inner shoulder of the tubular shaft may be inclined towards the longitudinal axis. Through the inclined inner shoulder the spring may be kept coaxially centered to the longitudinal axis of the tubular shaft. The tubular shaft may comprises an outer annular stop shoulder that limits insertion of the eyebolt into a threaded hole. The outer stop shoulder may comprise a seal for providing a tight, e.g. a fluid tight, seat of the eyebolt within the threaded bore.

The one-sided open ring of the eyebolt may be rotatably connected to the protrusions of the bolt. The one-sided open ring may be rotatable about an axis that is perpendicular to longitudinal axis of the tubular shaft. It is easier to handle the eyebolt, when the one-sided open ring is rotatably connected to the bolt and thereby to the tubular shaft.

The one-sided open ring may be supplemented with a bar that is connected adjacent the first end and adjacent the second end of the one-sided open ring thereby forming an eyelet. The bar enhances the stability and ensures that no actuation of the push-button by error occurs while, for example, being connected the hook of a crane.

The bolt may comprise a screw head at its first end and a thread portion at its second end. The bolt may comprise a nut threaded onto the thread portion thereby securing the bolt to the tubular shaft. The first end of the one-sided open ring may be connected to a first space between the tubular shaft and the screw head and the second end of the one-sided open ring may be connected to a second space between the tubular shaft and the nut. This forms a compact connection, because in this configuration the ring is secured to the bolt and the bolt is secured to the tubular shaft.

Another embodiment of the invention relates to a lifting eye which is used to be positioned within a threaded bore of a workpiece and which may be engaged by hook, e.g. by a hook of a crane. The lifting eye comprises a generally tubular shaft extending along a longitudinal axis, the tubular shaft having a front section formed with a radially outwardly open aperture and a rear section. A locking element comprises a threaded section. The locking element is radially displaceable in the aperture between an outer position with the threaded section projecting radially outward from the shaft and an inner position in which the threaded section is recessed within the tubular shaft. An actuating rod is coaxially slidable in the shaft between a front position and a rear position. The actuating rod comprises a push-button at its rod rear end. The actuating rod further comprises a structure for engaging the locking element in at least one of its positions pressing the locking element into the outer locking position. The outer locking position may also be considered as a screwable configuration, in which the lifting eye may be screwed in or out of a threaded bore. A spring is coaxially aligned with the longitudinal axis, having a first spring end abutting against the push-button of the actuating rod and having a second spring end abutting against an inner shoulder of the tubular shaft, the spring urging the actuating rod to its rear position. The push-button, e.g. its body, comprises a lengthwise oblong passage in which a bolt is positioned. The oblong passage limits a relative longitudinal movement between the bolt within the passage and the actuating rod. Therefore, the bolt within the oblong passage of the push-button is used to define and to limit the movement of the actuating rod within the tubular shaft of the lifting eye. The tubular shaft comprises throughgoings, in which the bolt is mounted whereas the bolt comprises protrusions protruding radially outward the tubular shaft. An eyelet is connected to the first protrusion using a first connecting element and the eyelet is connected to the second protrusion using a second connecting element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
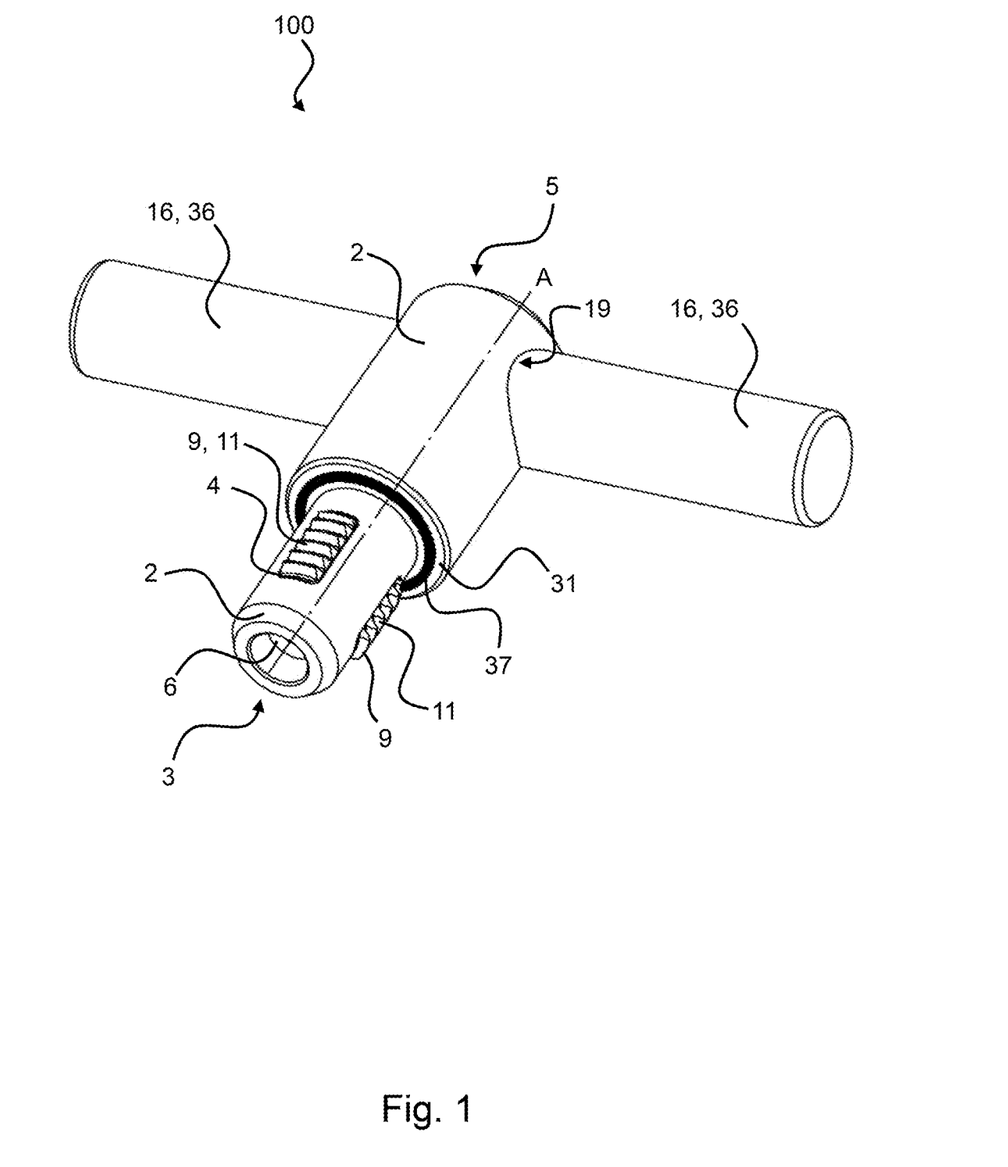
FIG. 1 is a perspective view of an exemplary embodiment of the invention in an unactuated configuration.
Figure 2:
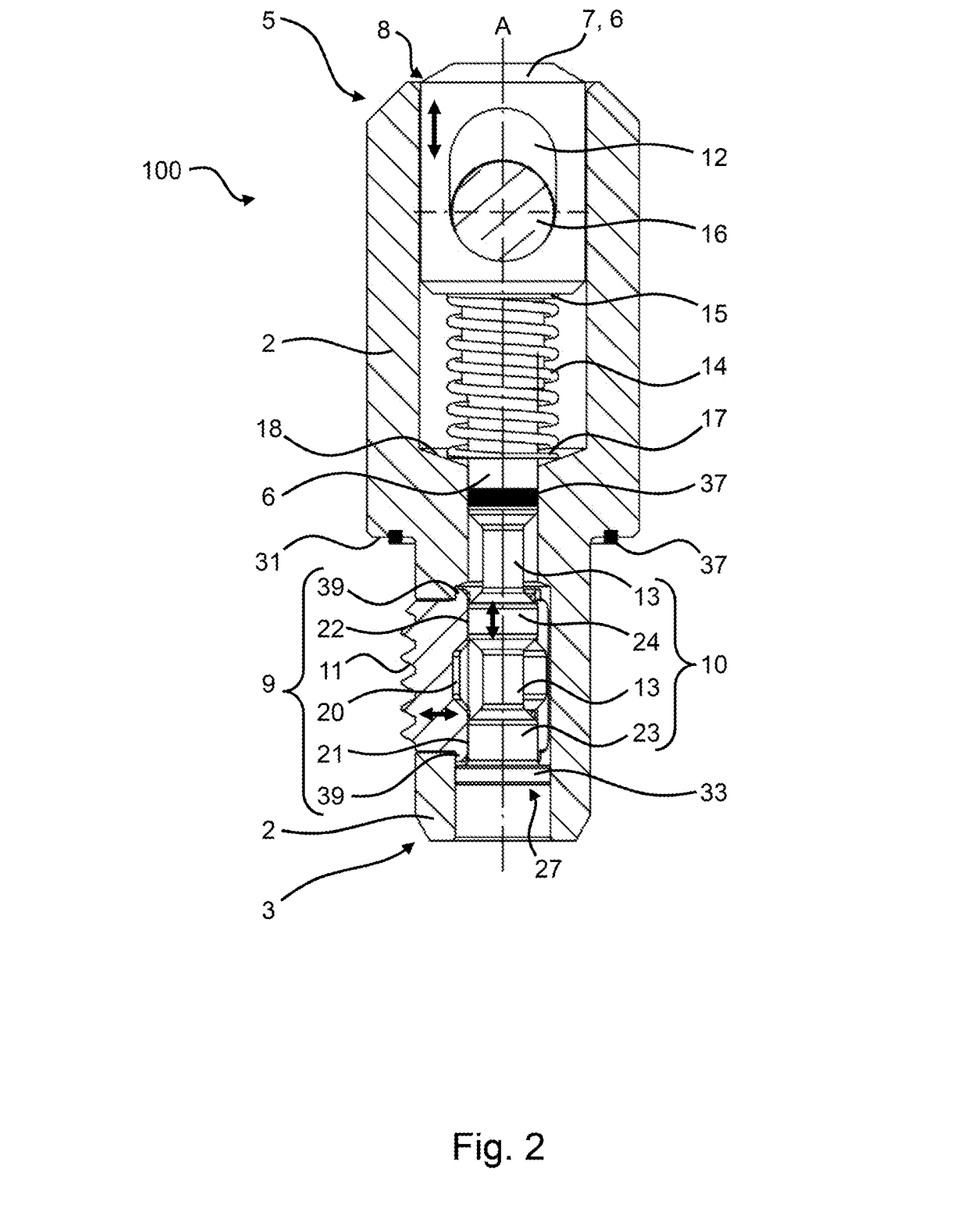
FIG. 2 is a section through the embodiment depicted in FIG. 1 in an unactuated configuration.

In FIGS. 1 and 2 a screwable lifting or lock pin 100 according to the invention is shown, which is basically centered on a longitudinal axis A. The lock pin 100 has a generally tubular shaft 2 extending along the longitudinal axis A with a front section 3 or front end formed with at least one radially outwardly open aperture 4 and a rear section 5 or a rear end. The tubular shaft 2 forms a passage for an actuating rod 6, which is coaxially slidable in the shaft 2 between at least one front position and at least one rear position. The actuating rod 6 comprises a push-button 7 at its rod rear end 8, the push-button 7 projecting axially outward of the rear section 5 end of the tubular shaft 2 at least when the actuating rod 6 is in its outermost unactuated rear position.

The lock pin 100, as an example, comprises a plurality of radially outwardly open apertures 4 that are angularly equispaced radially completely extending through the wall of the front section 3 of the tubular shaft 2. Accordingly, there is provided a number of locking elements 9 that corresponds to the number of the apertures 4 provided in the tubular shaft 2. For example, the lock pin 100 comprises three apertures 4 and three locking elements 9. Each locking element 9 comprises a threaded section 11 on its outer side. The locking elements 9 are radially displaceable in the apertures 4 between at least one outer locking position with the threaded section 11 projecting radially outward from the shaft 2 and in an inner position in which the threaded section 11 is recessed within the tubular shaft 2. The threaded section 11 does not extend outside the outer circumference of the tubular shaft 2 at all when the locking element 9 is in the inner position. When the at least one locking element 9 is in the outer position, the tubular shaft 2 with the intermittent thread built by the at least one threaded section 11 may be screwed into a threaded bore thereby axially fixing the tubular shaft 2 within the bore. When the at least one locking element 9 is in the inner position, the threaded section 11 is retracted within the tubular shaft 2 thereby enabling axial movement between the tubular shaft 2 and a threaded bore. The latter allowing fast insertion into or a fast removal out of the threaded hole.

The internal construction of the inventive lock pin 100 becomes apparent looking at the sectional view according to FIG. 2. The spring loaded actuating rod 6 comprises a structure 10 for engaging the locking element 9 in at least one of its positions, thereby pressing the locking element 9 with its threaded section 11 into the outer locking or screwing position. A spring 14 is coaxially aligned with the longitudinal axis A, having a first spring end 15 abutting against the push-button 7 of the actuating rod 6 and having a second spring end 17 abutting against an inner shoulder 18 of the tubular shaft 2, the spring 14 urging the actuating rod 6 to its rear position. Thus, the locking elements 9 are also urged to their outer position by the spring loaded actuating rod 6. For centering purposes of the spring 14, the inner shoulder 18 of the tubular shaft 2 is inclined towards the longitudinal axis A.

The locking elements 9 comprising the threaded section 11 are seated in the apertures 4 of the tubular shaft 2. For securing or for keeping the locking elements 9 within the tubular shaft 2, the locking elements 9 comprise at least one locking element protrusion 39 that is configured to be abutted against the inner surface of the tubular shaft 2. The locking element protrusion 39 may be an annular locking element protrusion 39. The locking element protrusion 39 may be arranged adjacent the threaded section 11. A notch 20 is located on the unthreaded side of the locking element 9. The notch 20 is surrounded by at least one abutment surface section 21, 22 for engagement with the structure 10 of the actuating rod 6. The structure 10 of the actuating rod 6 further comprises a first engagement collar 23 for engaging a first abutment surface section 21 of the locking element 9 in the outer locking position and a second engagement collar 24 for engaging a second abutment surface section 22 of the locking element 9 in the outer locking position. The second engagement collar 24 is axially spaced from the first engagement collar 23 and a groove 13 is provided adjacent each of the engagement collars 23, 24. The grooves 13 are formed with a radial depth such that at least one of the first and second engagement collars 23, 24, here the second engagement collar 24, substantially matches a radial depth of the notch 20 within the locking element 9. The grooves 13 are formed with an axial length, such that at least one of the first and second engagement collars 23, 24, here the second engagement collar 24, substantially matches an axial depth of the notch 20 within the locking element 9. This configuration allows the locking elements 9 to be retracted into the tubular shaft 2.

As an example, the transition between the upper groove 13 and an above positioned middle part of the actuating rod 6 may be formed with a flange having an inclined surface towards the longitudinal axis A. The transition between the upper groove 13 and the upper second engagement collar 24 of the actuating rod 6 may also be formed with a flange having an inclined surface towards the longitudinal axis A. The transition between the upper second engagement collar 24 and the lower groove 13 of the actuating rod 6 may be formed with a flange having an inclined surface towards the longitudinal axis A, too. And, the transition between the lower groove 13 and the adjacent lower part of the actuating rod 6 may also be formed with a flange having an inclined surface towards the longitudinal axis A. The flanges of the actuating rod 6 may match to flanges provided adjacent the notch 20 of the at least one locking element 9 thereby allowing a reliable radial movement of the locking element 9 within the aperture 4 upon changing the axial position of the actuating rod 6. The actuating rod 6 at its rod front end 27, as an example, comprises a centering portion 33 positioned adjacent the lower first engagement collar 23. The centering portion 33 is configured to center the actuating rod 6 on the longitudinal axis A.

The push-button 7 of the actuating rod 6, which is positioned axially movable within the rear section 5 of the tubular shaft 2, comprises a lengthwise oblong passage 12, in which a bolt 16 is positioned. The oblong passage 12 limits a relative longitudinal movement between the bolt 16 within the passage 12 and the actuating rod 6. Therefore, the bolt 16 within the oblong passage 12 of the push-button 7 is used to define and to limit the movement of the actuating rod 6 within the tubular shaft 2. As an example, the bolt 16 has a circular cross-section and the oblong passage 12 of the push-button 7 has a rounded upper end and a rounded lower end that match to the circular bolt 16. The bolt 16 and the oblong passage 12 may alternatively have a rectangular cross-section.

The push-button 7 may be of different colors. The color of the push-button 7 may form an indicator. For example, the color of the push-button 7 may form an indicator for the spring force of the spring 14, whereas each different color is associated to a predetermined spring force that has to be overcome for pushing the actuating rod 6 towards its front position. The color of the push-button 7 may also be assigned to a specific parameter of the (partially opened or intermittent) thread formed by the threaded sections 11 of the locking elements 9. For example, this parameter is the thread diameter or the pitch of the thread formed by the retractable threaded locking elements 9.

The tubular shaft 2, as an example, comprises an outer annular stop shoulder 31 for limiting the insertion of the lock pin 100 into a threaded hole. The outer stop shoulder 31 may be provided with a seal 37 for providing a tight, e.g. a fluid tight, seat of the lock pin 100 within the threaded bore. The actuation rod 6 may also comprise a seal 37 at its circumference for providing even better sealing. The sealing member of the actuation rod 6 is arranged at a rod section between the structure 10 for engaging the locking elements 9 and the spring 14, i.e. the inner shoulder 18 of the tubular shaft 2.

Referring to FIG. 1 again, the tubular shaft 2 comprises seats or throughgoings 19 in which the bolt 16 is accommodated thereby axially fixing the bolt 16 to the tubular shaft 2. The accommodation of the bolt 16 is, as an example, in a direction perpendicular to the longitudinal axis A. The bolt 16 may be rotatably mounted in the throughgoings 19 while being axially fixed to the tubular shaft 2. The bolt 16, which is mounted in the throughgoings 19, comprises protrusions 36 protruding radially outward the tubular shaft 2 near or at the rear end of the shaft rear section 5. These protrusions 36 may form a handle for fingers of a user.

Figure 3:
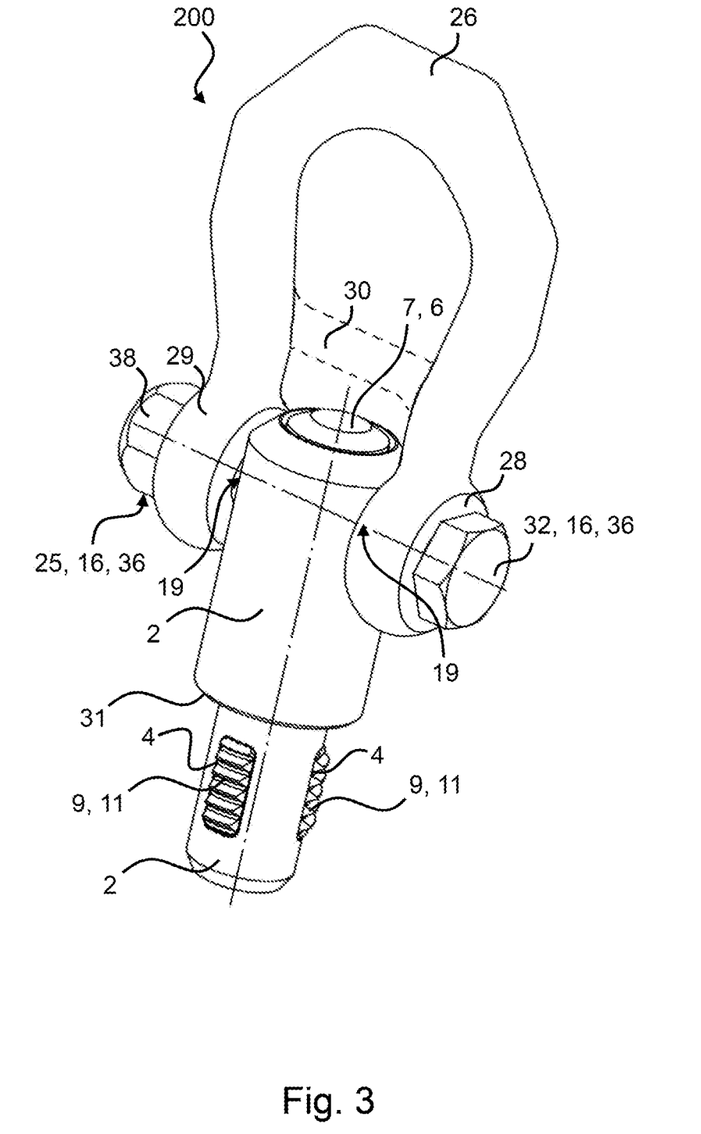
FIG. 3 is a perspective view of an exemplary embodiment of the invention in an unactuated configuration.

FIG. 3 shows a screwable eyebolt 200 being centered on a longitudinal axis A. The eyebolt 200 comprises a generally tubular shaft 2 extending along the longitudinal axis A with a front section 3 or a front end formed with at least one radially outwardly open aperture 4 and a rear section 5 or a rear end. The tubular shaft 2 forms a passage for an actuating rod 6, which is coaxially slidable in the shaft 2 between at least one front position and at least one rear position. The actuating rod 6 comprises a push-button 7 at its rod rear end 8, the push-button 7 projecting axially outward of the rear section 5 end of the tubular shaft 2 at least when the actuating rod 6 is in its outermost unactuated rear position.

The eyebolt 200, as an example, comprises a plurality of radially outwardly open apertures 4 that are angularly equispaced radially completely extending through the wall of the front section 3 of the tubular shaft 2. Accordingly, there is provided a number of locking elements 9 that corresponds to the number of the apertures 4 provided in the tubular shaft 2. For example, the eyebolt 200 comprises three apertures 4 and three locking elements 9. Each locking element 9 comprises a threaded section 11 on its outer side. The locking elements 9 are radially displaceable in the apertures 4 between at least one outer locking position with the threaded section 11 projecting radially outward from the shaft 2 and in an inner position in which the threaded section 11 is recessed within the tubular shaft 2. The threaded section 11 does not extend outside the outer circumference of the tubular shaft 2 at all when the locking element 9 is in the inner position. When the at least one locking element 9 is in the outer position, the tubular shaft 2 with the intermittent thread built by the at least one threaded section 11 may be screwed into a threaded bore thereby axially fixing the tubular shaft 2 within the bore. When the at least one locking element 9 is in the inner position, the threaded section 11 is retracted within the tubular shaft 2 thereby enabling axial movement between the tubular shaft 2 and a threaded bore. The latter allowing fast insertion into or a fast removal out of the threaded hole.

The push-button 7 of the actuating rod 6, which is positioned axially movable within the rear section 5 of the tubular shaft 2, comprises a lengthwise oblong passage 12, in which a bolt 16 is positioned. The oblong passage 12 limits a relative longitudinal movement between the bolt 16 within the passage 12 and the actuating rod 6. Therefore, the bolt 16 within the oblong passage 12 of the push-button 7 is used to define and to limit the movement of the actuating rod 6 within the tubular shaft 2. The tubular shaft 2 comprises throughgoings 19 in which the bolt 16 is accommodated thereby axially fixing the bolt 16 to the tubular shaft 2. The accommodation of the bolt 16 is, as an example, in a direction perpendicular to the longitudinal axis A. The bolt 16 may be rotatably mounted in the throughgoings 19 while being axially fixed to the tubular shaft 2.

The bolt 16, which is mounted in the throughgoings 19, comprises protrusions 36 protruding radially outward the tubular shaft 2 near or at the rear end of the shaft rear section 5. To these protrusions 36 a one-sided open ring 26 is connected. The ring 26 may be rotatably coupled to the protrusions 36. A first end 28 of the one-sided open ring 26 is connected to a first one of the protrusions 36 and a second end 29 of the one-sided open ring 26 is connected to a second one of the protrusions 36. For example, the one-sided open ring 26 may have a U-shape or a C-shape. Each end 28, 29 of the one-sided open ring 26 may be formed with an eyelet allowing passage of the bolt 16, i.e. its protrusions 36, there through. Therefore, the eyelets at the ring ends 28, 29 may match to the diameter of the bolt 16 or may be slightly larger. The bolt 16 of the eyebolt 200 comprises a screw head 32 at its first end and a thread portion 25 at its second end, the bolt 16 being secured to the tubular shaft 2 via a nut 38 threaded onto the thread portion 25. The first end 28 of the one-sided open ring 26 is coupled with the bolt 16 within a first space between the tubular shaft 2 and the screw head 32 and the second end 29 of the one-sided open ring 26 is coupled with the bolt 16 within a second space between the tubular shaft 2 and the nut 38. As illustrated in dashed lines, the one-sided open ring 26 may additionally comprise a bar 30 that is connected adjacent the first end 28 and adjacent the second end 29 of the one-sided open ring 26 thereby forming an eyelet. The bar 30 enhances stability and prevents an actuation of the push-button 7 in error, e.g. while connecting the hook of a crane to the ring 26.

Figure 4:
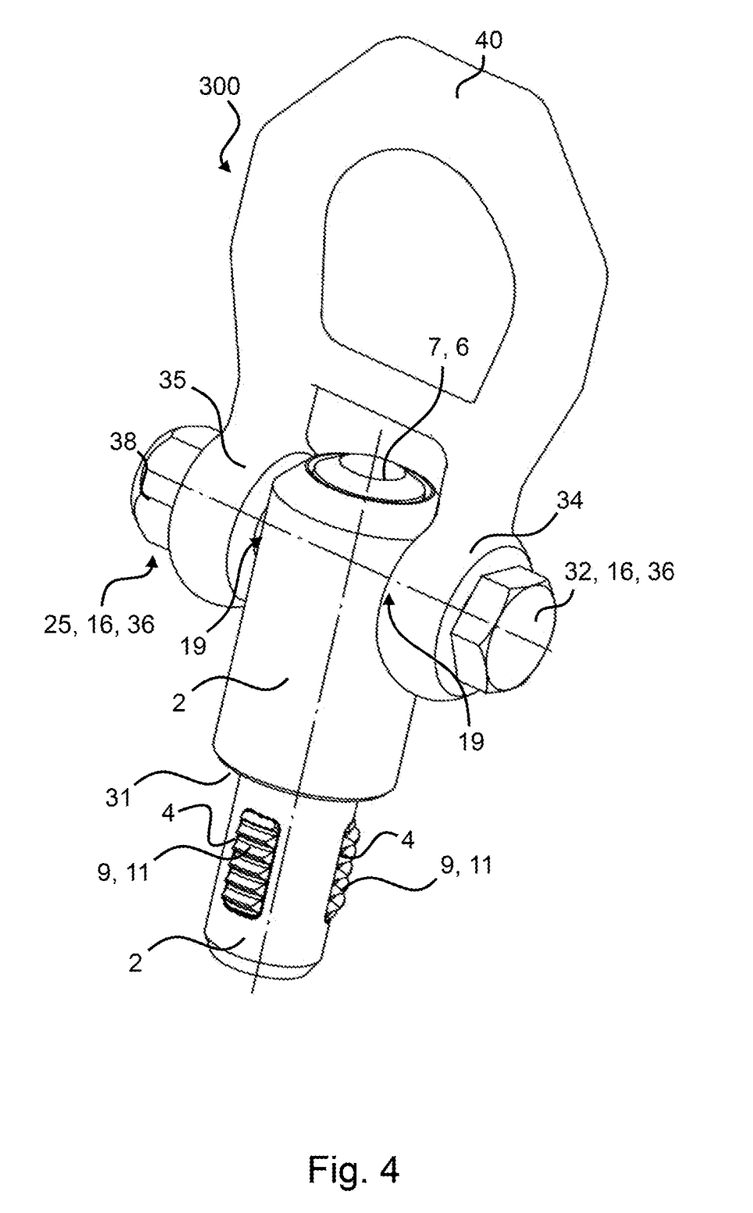
FIG. 4 is a perspective view of an exemplary embodiment of the invention in an unactuated configuration.

FIG. 4 shows a screwable lifting eye 300 being centered on a longitudinal axis A. The lifting eye 300 comprises a generally tubular shaft 2 extending along the longitudinal axis A with a front section 3 or a front end formed with at least one radially outwardly open aperture 4 and a rear section 5 or a rear end. The tubular shaft 2 forms a passage for an actuating rod 6, which is coaxially slidable in the shaft 2 between at least one front position and at least one rear position. The actuating rod 6 comprises a push-button 7 at its rod rear end 8, the push-button 7 projecting axially outward of the rear section 5 end of the tubular shaft 2 at least when the actuating rod 6 is in its outermost unactuated rear position. The lifting eye 300, as an example, comprises a plurality of radially outwardly open apertures 4 that are angularly equispaced radially completely extending through the front section 3 of the tubular shaft 2. Accordingly, there is provided a number of locking elements 9 that corresponds to the number of the apertures 4 provided in the tubular shaft 2. For example, the lifting eye 300 comprises three apertures 4 and three locking elements 9. Each locking element 9 comprises a threaded section 11 on its outer side. The locking elements 9 are radially displaceable in the apertures 4 between at least one outer locking position with the threaded section 11 projecting radially outward from the shaft 2 and in an inner position in which the threaded section 11 is recessed within the tubular shaft 2. The threaded section 11 does not extend outside the outer circumference of the tubular shaft 2 at all when the locking element 9 is in the inner position. When the at least one locking element 9 is in the outer position, the tubular shaft 2 with the intermittent thread built by the at least one threaded section 11 may be screwed into a threaded bore thereby axially fixing the tubular shaft 2 within the bore. When the at least one locking element 9 is in the inner position, the threaded section 11 is retracted within the tubular shaft 2 thereby enabling axial movement between the tubular shaft 2 and a threaded bore. The latter allowing fast insertion into or a fast removal out of the threaded hole.

The push-button 7 of the actuating rod 6, which is positioned axially movable within the rear section 5 of the tubular shaft 2, comprises a lengthwise oblong passage 12, in which a bolt 16 is positioned. The oblong passage 12 limits a relative longitudinal movement between the bolt 16 within the passage 12 and the actuating rod 6. Therefore, the bolt 16 within the oblong passage 12 of the push-button 7 is used to define and to limit the movement of the actuating rod 6 within the tubular shaft 2. The tubular shaft 2 comprises throughgoings 19 in which the bolt 16 is accommodated thereby axially fixing the bolt 16 to the tubular shaft 2. The accommodation of the bolt 16 is, as an example, in a direction perpendicular to the longitudinal axis A. The bolt 16 may be rotatably mounted in the throughgoings 19 while being axially fixed to the tubular shaft 2.

The bolt 16, which is mounted in the throughgoings 19, comprises protrusions 36 protruding radially outward the tubular shaft 2 near or at the rear end of the shaft rear section 5. To these protrusions 36 an eyelet 40 is connected. The eyelet 40 being connected to the first protrusion 36 by way of a first connecting element 34 and being connected to the second protrusion 36 by way of a second connecting element 35. The connecting elements 34, 35 may be rotatably coupled to the protrusions 36 of the bolt 16. Each connecting element 34, 35 may be formed with an eyelet allowing passage of the bolt 16, i.e. its protrusions 36, there through. Therefore, the eyelets of the connecting elements 34, 35 may match to the diameter of the bolt 16 or may be slightly larger. The bolt 16 of the lifting eye 300 comprises a screw head 32 at its first end and a thread portion 25 at its second end, the bolt 16 being secured to the tubular shaft 2 via a nut 38 threaded onto the thread portion 25. The first connecting element 34 is coupled with the bolt 16 within a first space between the tubular shaft 2 and the screw head 32 and the second connecting element 35 is coupled with the bolt 16 within a second space between the tubular shaft 2 and the nut 38.

Figure 5:
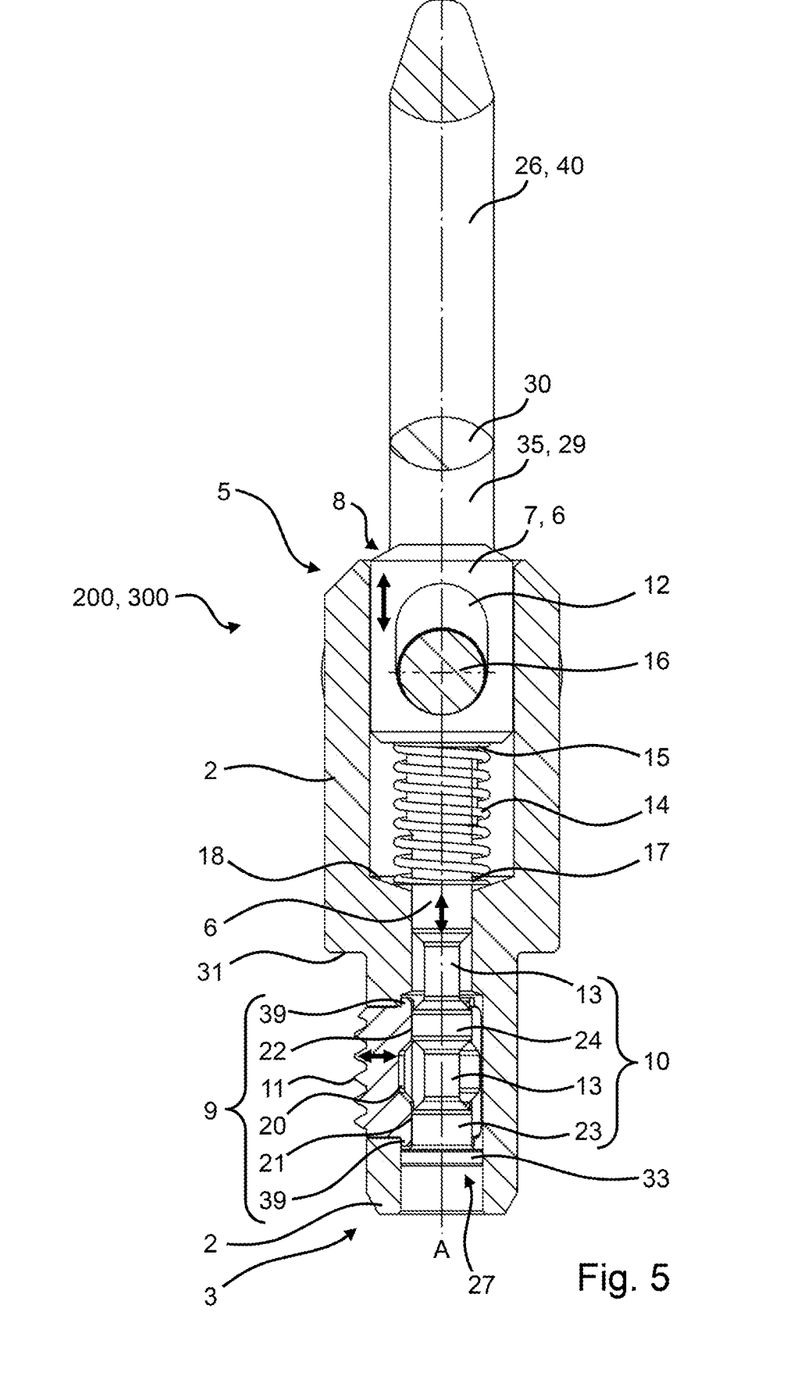
FIG. 5 is a section through the example of the invention according to FIG. 2 or the example of the invention according to FIG. 3.

The internal construction of the inventive eyebolt 200 including a bar 30 connected with the one-sided open ring 26 and the internal construction of the inventive lifting eye 300 are identical and become apparent looking at the sectional view according to FIG. 5.

The spring loaded actuating rod 6 comprises a structure 10 for engaging the locking element 9 in at least one of its positions, thereby pressing the locking element 9 with its threaded section 11 into the outer locking or screwing position. A spring 14 is coaxially aligned with the longitudinal axis A, having a first spring end 15 abutting against the push-button 7 of the actuating rod 6 and having a second spring end 17 abutting against an inner shoulder 18 of the tubular shaft 2, the spring 14 urging the actuating rod 6 to its rear position. Thus, the locking elements 9 are also urged to their outer position by the spring loaded actuating rod 6. For centering purposes of the spring 14, the inner shoulder 18 of the tubular shaft 2 is inclined towards the longitudinal axis A.

The locking elements 9 comprising the threaded section 11 are seated in the apertures 4 of the tubular shaft 2. For securing or for keeping the locking elements 9 within the tubular shaft 2, the locking elements 9 comprise at least one locking element protrusion 39 that is configured to be abutted against the inner surface of the tubular shaft 2. The locking element protrusion 39 may be an annular locking element protrusion 39. The locking element protrusion 39 may be arranged adjacent the threaded section 11. A notch 20 is located on the unthreaded side of the locking element 9. The notch 20 is surrounded by at least one abutment surface section 21, 22 for engagement with the structure 10 of the actuating rod 6. The structure 10 of the actuating rod 6 further comprises a first engagement collar 23 for engaging a first abutment surface section 21 of the locking element 9 in the outer locking position and a second engagement collar 24 for engaging a second abutment surface section 22 of the locking element 9 in the outer locking position. The second engagement collar 24 is axially spaced from the first engagement collar 23 and a groove 13 is provided adjacent each of the engagement collars 23, 24. The grooves 13 are formed with a radial depth such that at least one of the first and second engagement collars 23, 24, here the second engagement collar 24, substantially matches a radial depth of the notch 20 within the locking element 9. The grooves 13 are formed with an axial length, such that at least one of the first and second engagement collars 23, 24, here the second engagement collar 24, substantially matches an axial depth of the notch 20 within the locking element 9. This configuration allows the locking elements 9 to be retracted into the tubular shaft 2.

As an example, the transition between the upper groove 13 and an above positioned middle part of the actuating rod 6 may be formed with a flange having an inclined surface towards the longitudinal axis A. The transition between the upper groove 13 and the upper second engagement collar 24 of the actuating rod 6 may also be formed with a flange having an inclined surface towards the longitudinal axis A. The transition between the upper second engagement collar 24 and the lower groove 13 of the actuating rod 6 may be formed with a flange having an inclined surface towards the longitudinal axis A, too. And, the transition between the lower groove 13 and the adjacent lower part of the actuating rod 6 may also be formed with a flange having an inclined surface towards the longitudinal axis A. The flanges of the actuating rod 6 may match to flanges provided adjacent the notch 20 of the at least one locking element 9 thereby allowing a reliable radial movement of the locking element 9 within the aperture 4 upon changing the axial position of the actuating rod 6. The actuating rod 6 at its rod front end 27, as an example, comprises a centering portion 33 positioned adjacent the lower first engagement collar 23. The centering portion 33 is configured to center the actuating rod 6 on the longitudinal axis A.

The bolt 16 within the oblong passage 12 of the push-button 7 is used to define and to limit the movement of the actuating rod 6 within the tubular shaft 2. The bolt 16 has a circular cross-section and the oblong passage 12 of the push-button 7 has a rounded upper end and a rounded lower end that match to the circular bolt 16. The bolt 16 and the oblong passage 12 may alternatively have a rectangular cross-section.

The push-button 7 of the eyebolt 200 or the lifting eye 300 may be of different colors. The color of the push-button 7 may form an indicator. For example, the color of the push-button 7 may form an indicator for the spring force of the spring 14, whereas each different color is associated to a predetermined spring force that has to be overcome for pushing the actuating rod 6 towards its front position. The color of the push-button 7 may also be assigned to a specific parameter of the (partially opened or intermittent) thread formed by the threaded sections 11 of the locking elements 9. For example, this parameter is the thread diameter or the pitch of the thread formed by the retractable threaded locking elements 9. The color may also be assigned to a ring diameter of the one-sided open ring 26 or the eyelet 40.

The tubular shaft 2, as an example, comprises an outer annular stop shoulder 31 for limiting the insertion of the eyebolt 200 or the lifting eye 300 into a threaded hole. In contrast to the ring bolt 100 in FIGS. 1 and 2, the eyebolt 200 and the lifting eye 300 do not provide any sealing member. However, the outer stop shoulder 31 may nevertheless be provided with a seal 37 for providing a tight, e.g. a fluid tight, seat of the eyebolt 200 or the lifting eye 300 within the threaded bore. The actuation rod 6 may also comprise a seal 37 at its circumference for providing even better sealing. The sealing member of the actuation rod 6 may then be arranged at a rod section between the structure 10 for engaging the locking elements 9 and the spring 14, i.e. the inner shoulder 18 of the tubular shaft 2.

For insertion of the inventive devices into a threaded hole, a user may push the push-button 7 thereby allowing radial displacement of the threaded sections 11 to the inner retracted position. In this configuration the tubular shaft 2 can slide axially into the threaded bore with no or almost no interference with the thread within the bore. When the device is put in place, the push-button 7 may be released thereby urging the threaded sections 11 of the locking elements 9 to their outer position in which they engage with the flanks of the thread within the bore. In this configuration the tubular shaft 2 is axially fixed within the bore while it may also be screwed further (e.g. only a half rotation or less in locking direction, which could be clockwise or counter-clockwise) until a tight seat of the device is reached. For releasing the device out of the threaded bore, the user may push the push-button 7 again (e.g. after loosening the device with only a half rotation or less against the locking direction), thereby urging the threaded sections 11 into their retracted inner position in which the tubular shaft 2 may slide axially out of the bore with no or almost no interference with the thread within the bore.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A lock pin comprising:
   a generally tubular shaft extending along a longitudinal axis and having a front section formed with a radially outwardly open aperture and a rear section,
   at least one locking element comprising a threaded section and being radially displaceable in the aperture between an outer position with the threaded section projecting radially outward from the shaft and an inner position in which the threaded section is recessed within the tubular shaft,
   an actuating rod coaxially slidable in the shaft between a front position and a rear position,
   the actuating rod comprising a push-button at its rod rear end,
   the actuating rod comprising a structure for engaging the locking element in at least one of its positions pressing the locking element into the outer locking position,
   a spring coaxially aligned with the longitudinal axis, having a first spring end abutting against the push-button of the actuating rod and having a second spring end abutting against an inner shoulder of the tubular shaft, the spring urging the actuating rod to its rear position,
   wherein the push-button comprises a lengthwise oblong passage, in which a bolt is positioned, the oblong passage limiting a longitudinal movement between the bolt within the passage and the actuating rod.

2. The lock pin according to claim 1, wherein the tubular shaft comprises seats in which the bolt is accommodated thereby axially fixing the bolt to the tubular shaft.

3. The lock pin according to claim 1, wherein the tubular shaft comprises seats or throughgoings in which the bolt is rotatably mounted thereby axially fixing the bolt to the tubular shaft.

4. The lock pin according to claim 1, wherein the tubular shaft comprises throughgoings in which the bolt is mounted, the bolt comprising protrusions protruding radially outward of the tubular shaft.

5. The lock pin according to claim 1, wherein the locking element comprises a notch on its unthreaded side that is surrounded by at least one abutment surface section for engagement with the structure of the actuating rod, the structure of the actuating rod comprising a first engagement collar for engaging a first abutment surface section of the locking element in the locking position, the structure of the actuating rod comprising a second engagement collar for engaging a second abutment surface section of the locking element in the locking position, the second engagement collar being axially spaced from the first engagement collar, wherein a groove is provided adjacent each engagement collar.

6. The lock pin according to claim 5, wherein the grooves are formed with a radially depth, such that one of the first and second engagement collars substantially matches a radial depth of the notch within the locking element.

7. The lock pin according to claim 5, wherein the grooves are formed with an axially length, such that the one of the first and second engagement collars substantially matches an axial depth of the notch within the locking element.

8. The lock pin according to claim 1, wherein the inner shoulder of the tubular shaft is inclined towards the longitudinal axis.

9. An eyebolt comprising:
a generally tubular shaft extending along a longitudinal axis and having a front section formed with a radially outwardly open aperture and a rear section,
at least one locking element comprising a threaded section and being radially displaceable in the aperture between an outer position with the threaded section projecting radially outward from the shaft and an inner position in which the threaded section is recessed within the tubular shaft,
an actuating rod coaxially slidable in the shaft between a front position and a rear position,
the actuating rod comprising a push-button at its rod rear end,
the actuating rod comprising a structure for engaging the locking element in at least one of its positions pressing the locking element into the outer locking position,
a spring coaxially aligned with the longitudinal axis, having a first spring end abutting against the push-button of the actuating rod and having a second spring end abutting against an inner shoulder of the tubular shaft, the spring urging the actuating rod to its rear position,
the push-button comprises a lengthwise oblong passage, in which a bolt is positioned, the oblong passage limiting a longitudinal movement between the bolt within the passage and the actuating rod,
the tubular shaft comprising throughgoings, in which the bolt is mounted, the bolt comprising protrusions protruding radially outward of the tubular shaft, and
a one-sided open ring, wherein a first end of a one-sided open ring is connected to a first one of the protrusions and a second end of the one-sided open ring is connected to a second one of the protrusions.

10. The eyebolt according to claim 9, wherein the locking element comprises a stop protrusion on its unthreaded side for securing the locking element within the aperture of the tubular shaft.

11. The eyebolt according to claim 9, wherein the locking element comprises a notch on its unthreaded side that is surrounded by at least one abutment surface section for engagement with the structure of the actuating rod.

12. The eyebolt according to claim 11, wherein the structure of the actuating rod comprises a first engagement collar for engaging a first abutment surface section of the locking element in the locking position, the structure of the actuating rod comprising a second engagement collar for engaging a second abutment surface section of the locking element in the locking position, the second engagement collar being axially spaced from the first engagement collar, wherein a groove is provided adjacent each engagement collar.

13. The eyebolt according to claim 12, wherein the grooves are formed with a radially depth, such that one of the first and second engagement collars substantially matches a radial depth of the notch within the locking element.

14. The eyebolt according to claim 13, wherein the grooves are formed with an axially length, such that the one of the first and second engagement collars substantially matches an axial depth of the notch within the locking element.

15. The eyebolt according to claim 9, wherein the inner shoulder of the tubular shaft is inclined towards the longitudinal axis.

16. The eyebolt according to claim 9, wherein the one-sided open ring is rotatably connected to the protrusions of the bolt.

17. The eyebolt according to claim 9, wherein the ring comprises a bar which is connected adjacent the first end and adjacent the second end of the one-sided open ring thereby forming an eyelet.

18. The eyebolt according to claim 9, wherein the bolt comprises a screw head at its first end and a thread portion at its second end, the bolt being secured to the tubular shaft via a nut threaded onto the thread portion.

19. The eyebolt according to claim 18, wherein the first end of the one-sided open ring is connected to a first space between the tubular shaft and the screw head and wherein the second end of the one-sided open ring is connected to a second space between the tubular shaft and the nut.

20. A lifting eye comprising:
a generally tubular shaft extending along a longitudinal axis and having a front section formed with a radially outwardly open aperture and a rear section,
at least one locking element comprising a threaded section and being radially displaceable in the aperture between an outer position with the threaded section projecting radially outward from the shaft and an inner position in which the threaded section is recessed within the tubular shaft,
an actuating rod coaxially slidable in the shaft between a front position and a rear position,
the actuating rod comprising a push-button at its rod rear end,
the actuating rod comprising a structure for engaging the locking element in at least one of its positions pressing the locking element into the outer locking position,
a spring coaxially aligned with the longitudinal axis, having a first spring end abutting against the push-button of the actuating rod and having a second spring end abutting against an inner shoulder of the tubular shaft, the spring urging the actuating rod to its rear position,
the push-button comprises a lengthwise oblong passage, in which a bolt is positioned, the oblong passage limiting a longitudinal movement between the bolt within the passage and the actuating rod,
the tubular shaft comprising throughgoings, in which the bolt is mounted, the bolt comprising protrusions protruding radially outward of the tubular shaft, and
an eyelet being connected to the first protrusion by way of a first connecting element and being connected to the second protrusion by way of a second connecting element.

* * * * *